E. J. FROST.
GEAR.
APPLICATION FILED MAR. 29, 1911.

998,686.

Patented July 25, 1911.

Witnesses
Albert A. Hofmann
Elizabeth M. Brown

Inventor
Edward J. Frost.
By Edward N. Pagelsen
Attorney

UNITED STATES PATENT OFFICE.

EDWARD J. FROST, OF JACKSON, MICHIGAN.

GEAR.

998,686.  Specification of Letters Patent.  Patented July 25, 1911.

Application filed March 29, 1911. Serial No. 617,650.

*To all whom it may concern:*

Be it known that I, EDWARD J. FROST, a citizen of the United States, and a resident of Jackson, in the county of Jackson and State of Michigan, have invented a new and useful Gear, of which the following is a specification.

This invention relates to the teeth of gear wheels and its object is to provide toothed gearing which shall be substantially noiseless in operation, which may be easily and quickly repaired, and which may be constructed so as to have a predetermined breaking point.

This invention comprises a body of any desired material and separate teeth of sheet metal, properly formed and secured in position, which teeth may, if desired, be afterward accurately finished in a proper milling, planing, grinding or generating machine.

Figure 1:
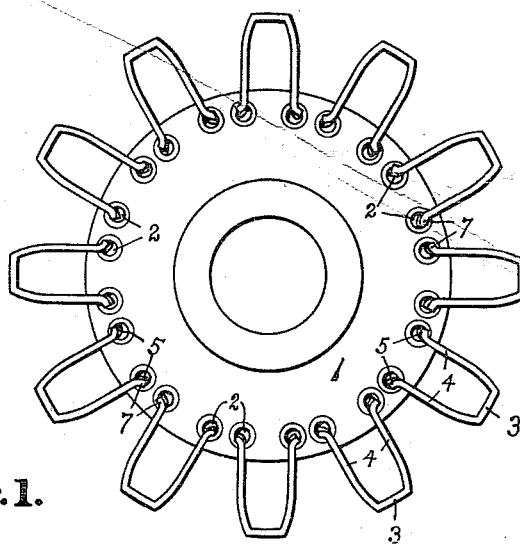
Figure 2:
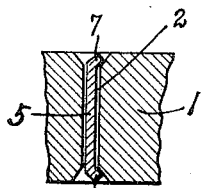
Figure 3:
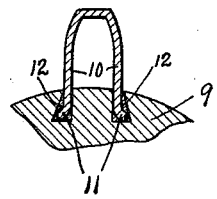
Figure 4:
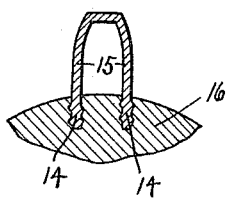

In the accompanying drawing, Figure 1 is a side elevation of a gear embodying this invention. Fig. 2 is a section showing one method of securing the teeth in position. Figs. 3 and 4 are transverse cross sections showing other methods of securing the teeth.

Similar reference characters refer to like parts throughout the several views.

The body 1 of the gear shown in Fig. 1 may be of any desired material, and is formed with a series of holes 2, two for each tooth, which holes may be countersunk at their ends. Slots are cut through the face of the body into these holes. Teeth are formed from resilient sheet metal with crowns 3, sides 4, and feet 5. These teeth are then slipped longitudinally into the slots and holes in the body 1 as shown in Fig. 1.

The corners 6 of the feet may be turned over as shown at 7 in Fig. 2, so as to hold the teeth in position. After the teeth are secured in position, the gear may be placed in a grinding or milling machine so that the teeth may be brought to the exact contours desired. Gears provided with these resilient teeth are especially adapted to mesh tightly with each other or with solid teeth, so as to avoid noise. The strength of the teeth can be determined with reasonable accuracy so that reliance may be placed on these teeth giving way when dangerous stresses are placed on machinery driven thereby.

In Fig. 3, the body 9 is shown formed with slots which taper outwardly. The sides 10 of the teeth have feet 11 as before described. Any fusible metal 12 may be poured around the feet of the sides, as shown, to firmly hold the teeth in position. In Fig. 4 the ends 14 of the sides 15 of the teeth are shown roughened. These teeth may be placed in a proper mold and the metal of the body 16 may be cast around these ends to unite with them.

While any resilient metal may be employed, sheet brass will usually be found desirable for light loads and sheet steel for heavier loads, tempered spring steel being adapted for teeth where the loads are heavy and uneven.

Many changes in the designs and constructions of the various parts may be made by engineers without departing from the spirit of my invention, which I claim is:—

1. A gear, comprising a body, and a series of teeth formed of sheet metal independent of each other and having the inner edges of the sides of the teeth secured in the body and properly formed to prevent displacement.

2. A gear comprising a body having a series of holes along its edge parallel to its axis and slots through its face connecting to said holes, and a series of teeth formed of resilient sheet metal having their inner edges inserted longitudinally in said slots and so bent as to be prevented from pulling out radially from the same.

3. A gear comprising a body having a series of holes along its edge countersunk at their ends and parallel to its axis and slots through its face connecting to said holes, and a series of teeth formed of resilient sheet metal having the edges of their sides turned at an angle and slid longitudinally into said slots and holes, the corners of said sides being bent to prevent removal of the teeth.

In testimony whereof I have signed this specification in the presence of two subscribing witnesses.

EDWARD J. FROST.

Witnesses:
 GEO. F. HOPKINS,
 A. R. FORD.

Copies of this patent may be obtained for five cents each, by addressing the "Commissioner of Patents, Washington, D. C."